United States Patent [19]

Burandt

[11] Patent Number: 4,721,016
[45] Date of Patent: Jan. 26, 1988

[54] MULTIPLE-STAGE GEARED ROTARY ACTUATOR

[75] Inventor: Wesley A. Burandt, Rockford, Ill.

[73] Assignee: Sundstrand Corporation, Rockford, Ill.

[21] Appl. No.: 633,871

[22] Filed: Jul. 23, 1984

[51] Int. Cl.⁴ .............................................. F16H 1/28
[52] U.S. Cl. ........................................ 74/801; 74/768
[58] Field of Search .................. 74/768, 750 R, 769, 74/785, 801, 660, 411, 665 GA, 665 G, 421 R, 394, 410; 29/446, 452, 159.2

[56] References Cited

U.S. PATENT DOCUMENTS

| | | | |
|---|---|---|---|
| 593,652 | 11/1897 | Hardingham | 74/768 |
| 641,097 | 1/1900 | Gerard | 74/768 |
| 707,672 | 8/1902 | Baker | 74/768 |
| 1,405,237 | 1/1922 | Linden | 74/768 |
| 2,091,637 | 8/1937 | Hoffman et al. | 74/410 |
| 2,150,983 | 3/1939 | Murray | 74/785 X |
| 2,378,967 | 6/1945 | Andrew | 74/394 |
| 2,567,482 | 9/1951 | Hoffman et al. | 74/801 X |
| 2,966,808 | 1/1961 | Grudin | 74/640 |
| 3,008,355 | 11/1961 | Grudin | 74/801 |
| 3,213,713 | 10/1965 | Sagara | 74/801 |
| 3,234,821 | 2/1966 | Himmel et al. | 74/768 X |
| 3,381,546 | 5/1968 | Holl | 74/769 X |
| 3,640,150 | 2/1972 | Leiner et al. | 74/801 X |
| 4,171,473 | 10/1979 | Hügin | 74/750 R X |
| 4,391,163 | 7/1983 | Benthake et al. | 74/768 |
| 4,472,984 | 9/1984 | Cook | 74/768 X |
| 4,513,637 | 4/1985 | Hirt | 74/768 X |
| 4,578,993 | 4/1986 | Burandt | 74/674 X |

FOREIGN PATENT DOCUMENTS 328472 11/1903 France .................................. 74/768

*Primary Examiner*—Lawrence Staab
*Assistant Examiner*—David Novais
*Attorney, Agent, or Firm*—Wood, Dalton, Phillips, Mason & Rowe

[57] ABSTRACT

A multiple-stage geared rotary actuator having a plurality of balanced compound differentials providing a multiple-stage output and for converting a high-speed, low-torque input to a low-speed, high-torque output for moving a member, such as an aircraft flight control surface. The balanced compound planetary differentials each have a plurality of planet gear shafts with a center gear and outer gears at opposite sides of the center gear and with the tubular planet gear shafts of the planetary differentials being in axial alignment. The maximum deflection resulting from bending forces acting on the tubular planet gear shafts is minimized by changing the boundary conditions at the ends of the planet gear shafts. This change in the boundary conditions is achieved by the use of structure positioned within the planetary gear shafts and extending through the length of the rotary gear actuator and common to all of the axially aligned tubular gear shafts, with one embodiment of such support structure being a bolt which preloads the adjacent tubular planet gear shafts. The support of the tubular planet gear shafts enables the design of a geared rotary actuator using longer planet gear shafts for increased torque-transmitting capability while keeping planet gear shaft deflections within acceptable limits for optimum gear mesh.

2 Claims, 8 Drawing Figures

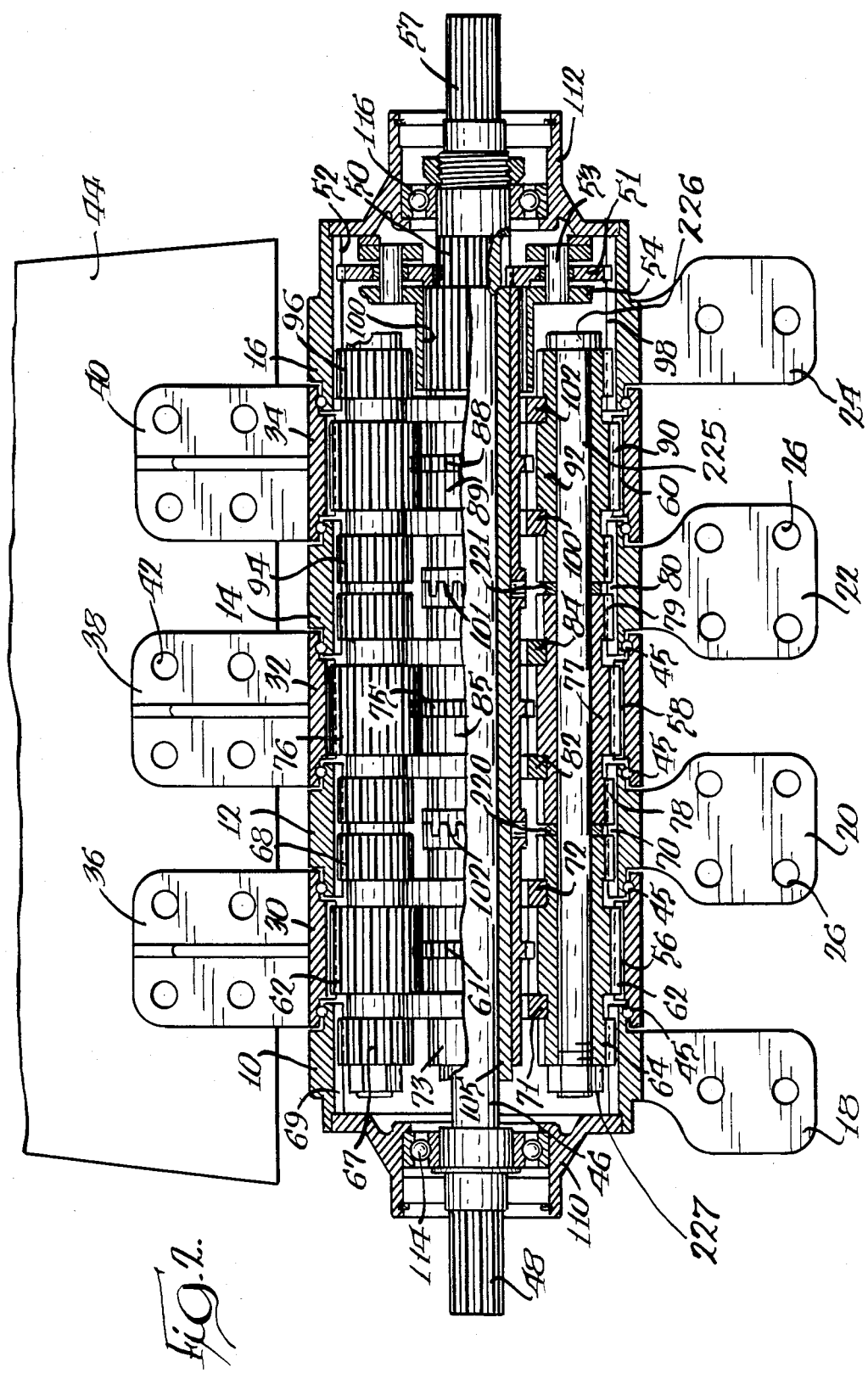

MULTIPLE-STAGE GEARED ROTARY ACTUATOR

DESCRIPTION

1. Technical Field

This invention pertains to a multiple-stage geared rotary actuator with an improved design which provides higher torque capacity per unit weight and volume of the geared rotary actuator. The multiple-stage geared rotary actuator has a compact assembly of balanced compound differentials providing a plurality of output stages. Axially aligned tubular planet gear shafts of the compound differentials have common support means extended therethrough for reducing deflections at the ends of the planet gear shafts which enables increased loading at each of the stages. The multiple-stage geared rotary actuator has particular utility in positioning of aircraft flight control surfaces wherein it is desirable to minimize the weight and volume of the geared rotary actuator while maximizing the torque capacity.

2. Background Art

Many different aircraft utilize multiple-stage geared rotary actuators for positioning of aircraft flight control surfaces, such as leading edge flaps. With there being a maximum permissible diameter for such a geared rotary actuator, multiple-stage outputs are frequently used in order to sufficiently react against air loads imposed upon the aircraft flight control surfaces. The multiple-stage geared rotary actuator is a known type of device which, when compared to other types of actuators, provides higher torque capacity per unit weight and volume.

In the design of a multiple-stage geared rotary actuator, there are three different design options that may be considered in order to meet the output load requirements. As the output load requirements increase, it is possible to either increase the diameter of the actuator envelope, add another output stage, or increase the length of each planet gear shaft in the compound differential planetaries utilized in the geared rotary actuator.

The first two options are least effective in minimizing the increase in weight and volume of the geared rotary actuator.

The most effective option is to increase the length of each of the planet gear shafts. This provides more strength and, therefore, more torque-transmitting capability. There are limitations to how long a planet gear shaft can be before planet gear shaft deflection becomes a problem. The deflection of the planet gear shafts is the result of a bending force and their being loaded as a cantilever beam fixed at one point. This deflection is proportional to the cube of the distance from the resultant of the bending forces to the point at which the planet gear shaft is supported. It is known to compensate for this deflection by incorporating tooth profile and taper modifications to the outer gears of the planet gear shafts of the compound differential.

It is desirable to minimize the deflection of a planet gear shaft, since the deflection results in lessening the gear mesh of the gears on the planet gear shaft and the modifications to overcome this are complicated and expensive.

There are geared rotary actuators utilizing simple planetaries to provide torque multiplication, and a number of simple planetaries may be placed in series to obtain the desired torque multiplication. In such a construction, each simple planetary would have a carrier for the planet gear shafts, which would avoid the deflection problem; however, a geared rotary actuator having a series of simple planetaries is not the optimum design for minimizing weight and volume of the unit since the number of carriers used would take up space and each succeeding simple planetary would have to be increased in size for torque delivery. Such a device requires more length than the geared rotary actuator using compound differentials for delivering the same torque.

The prior art does not disclose a multiple-stage geared rotary actuator having a plurality of compound differential planetary stages with supported planet gear shafts which minimizes weight and size as well as cost for a given output load requirement.

Disclosure of the Invention

The multiple-stage geared rotary actuator of the type disclosed herein is a device to provide a gear ratio change as well as a hinge. The geared rotary actuator has a series of output stages that may be connected to aircraft flight control surfaces, such as leading edge flaps, and fixed connections to the aircraft frame. With such use, there is normally a limitation on the maximum diameter of the geared rotary actuator and, therefore, if a geared rotary actuator is to be designed to meet increased output load requirements, there is the possibility of either adding additional stages to the geared rotary actuator or increasing the length of the planet gear shafts in the compound differentials embodied in the geared rotary actuator. The addition of stages results in a greater increase in size and weight of the device than lengthening the planet gear shafts and, therefore, the invention disclosed herein relates to means whereby the planet gear shafts can be lengthened for increased output load requirements while avoiding the problems which would normally be encountered by resulting increased deflection at the ends of the planet gear shafts.

In accordance with the preceding paragraph, the invention embodies the support of axially-aligned tubular planet gear shafts in successive stages by means extended through the axially-aligned tubular planet gear shafts which support the ends of the planet gear shafts and react against bending forces applied to the ends of the tubular gear shafts to reduce deflection and thereby maximize the gear mesh of gears carried on the planet gear shafts for maximum torque transmission.

A primary feature of the invention is to provide a multiple-stage geared rotary actuator having a plurality of compound differential planetary stages not using planet carriers wherein the planet gear shafts are supported to minimize deflection under bending loads and permit the use of relatively long planet gear shafts with full gear mesh for maximum torque transmission.

More particularly, the multiple-stage geared rotary actuator has a plurality of balanced compound differential planetary stages, with each stage having a plurality of tubular planet gear shafts having gears in mesh with other components of the differential planetary and with axially-aligned tubular planet gear shafts having common means extended thereto from end-to-end of the stages for support of the ends of the tubular planet gear shafts in opposition to bending forces tending to deflect the ends of the tubular planet gear shafts.

The multiple-stage geared rotary actuator provides for maximum torque capacity while minimizing the weight and volume of the geared rotary actuator by avoiding the use of planet carriers and maximizing the effectiveness of the planet gear shafts in the compound differential planetary stages. This is accomplished by reducing the amount of deflection occurring at the ends of lengthened planet gear shafts to enable increasing the gear mesh of gears carried thereon and thereby increase the torque capacity of the geared rotary actuator.

An object of the invention is to provide a multiple-stage geared rotary actuator having a plurality of compound differential planetary stages with each stage having a sun gear, plural ring gears, and a plurality of tubular planet gear shafts each having a central gear in mesh with the sun gear and a ring gear and a pair of outer gears at either side of the central gear in mesh one with each of a pair of ring gears, said tubular planet gear shafts of said stages all being in alignment, the improvement comprising means extended through and between aligned tubular planet gear shafts of said plural compound differential planetary stages to minimize deflection at the ends of said tubular planet gear shafts.

A further object of the invention is to provide a geared rotary actuator for translating a high-speed low-torque drive into a low-speed high-torque drive output for moving a member comprising, a series of driven sun gears, a plurality of ring gears with one set of ring gears being fixed and in spaced relation and a second set of ring gears being movable and one in each space between fixed ring gears and with the movable ring gears surrounding the sun gears, a plurality of tubular planet gear shafts associated with each sun gear and each having a central gear in mesh with the sun gear and said surrounding movable ring gear and a pair of outer gears at opposite sides of the central gear in mesh with the fixed ring gears, said tubular planet gear shafts associated with a sun gear being in alignment with and rotating about the sun gear in the same direction as the tubular planet gear shafts associated with an adjacent sun gear, and means common to a group of axially aligned tubular planet gear shafts to support the ends thereof against deflection under load.

BRIEF DESCRIPTION OF THE DRAWINGS

FIG. 2 is a central vertical section of the multiple-stage geared rotary actuator shown in FIG. 1;

BEST MODES FOR CARRYING OUT THE INVENTION

Figure 1:
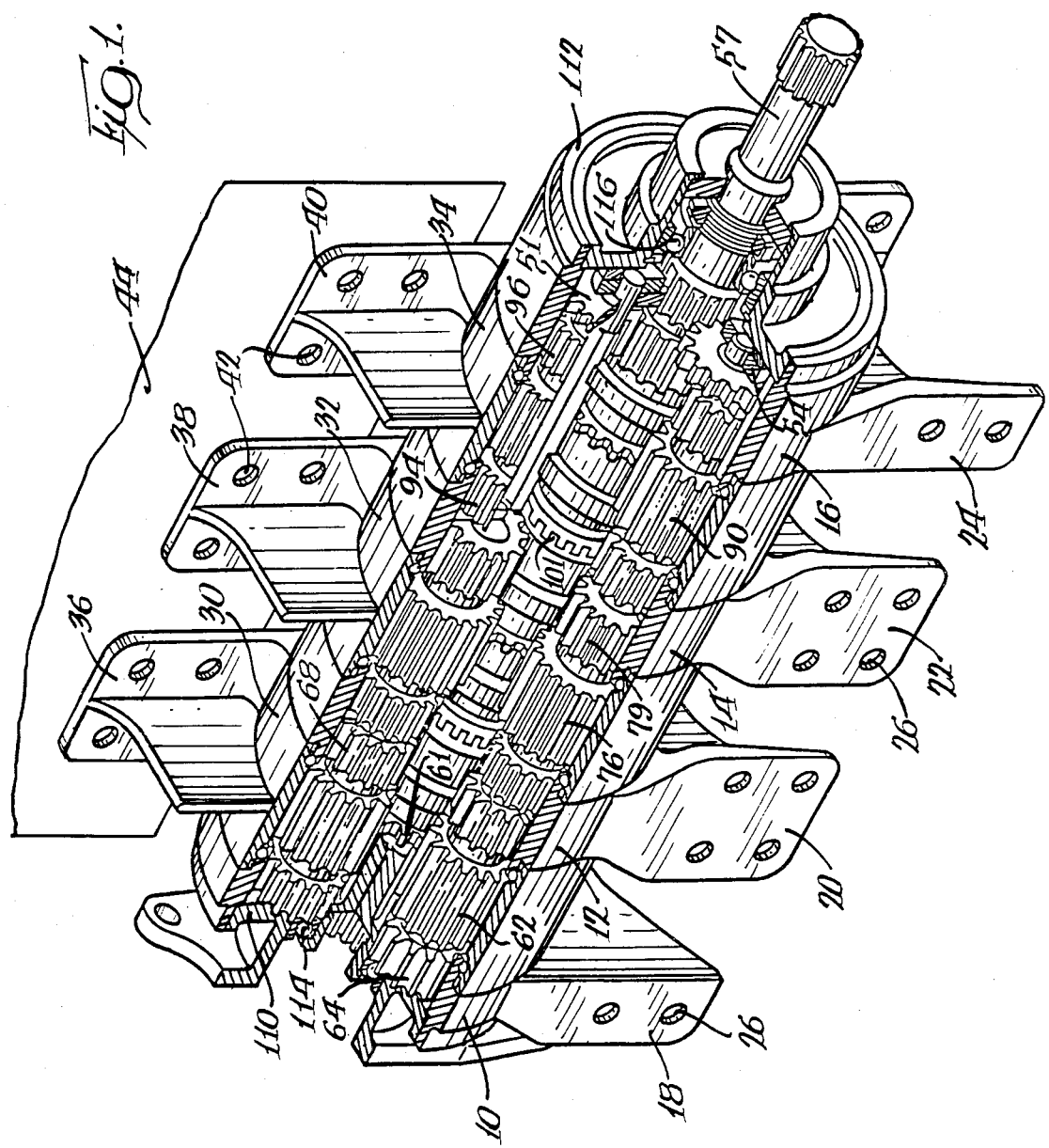
FIG. 1 is a perspective view, with parts broken away, of a multiple-stage geared rotary actuator embodying the invention.

The multiple-stage geared rotary actuator has a housing made up of a series of relatively rotatable annular housing sections. A first alternating series of the housing sections are secured to a fixed member, such as the aircraft frame, and a second series of housing sections alternating with the first series define output stages connectable to an aircraft flight control surface, such as a leading edge flap. More particularly, the housing sections 10, 12, 14 and 16 each have a bracket 18, 20, 22, and 24, respectively, provided with openings 26 through which fastening means can extend for fastening the brackets to the aircraft frame member. The multiple-stage outputs are shown to be three in number and are provided by the housing sections 30, 32, and 34, each having an integral bracket 36, 38 and 40, respectively, with openings 42 through which fastening means can extend for securing the brackets to a panel 44 which may be the flight control surface of an aircraft.

The output stages defined by the housing sections 30, 32 and 34 are rotatable relative to the fixed housing sections 18, 20, 22 and 24 by means of bearings 45 fitted between the housing sections.

The multiple-stage geared rotary actuator is connected to a high-speed low-torque drive from a power source and provides a low-speed, high-torque output for moving the panel 44. This drive transmission is accomplished by use of a plurality of balanced compound planetary differentials associated one with each of the output stages.

A drive shaft 46 extends through the geared rotary actuator and has a drive input end 57 connectable to a power source by suitable means and a drive output end 48 which can be connected to an additional geared rotary actuator in line with the one disclosed. The drive shaft 46 connects to a simple planetary input stage and has a sun gear 50 in mesh with planet gears 51 which mesh with an internal ring gear 52 on the fixed annular housing section 16. The planet gears 51 are mounted on shafts 53 supported by a planet gear carrier 54 with the planetary gear carrier 54 being connected to the input gears of the compound differential planetary stages.

There are three output stages shown, with each output stage having an internal ring gear 56, 58, and 60 associated with the annular housing sections 30, 32 and 34, respectively. With the drive of the input shaft 46, these housing sections and associated ring gears are caused to rotate by the compound differential planetary gearing. Referring to the third output stage having the ring gear 56, there is a driven sun gear 61 which meshes with the central gears 62 on a series of tubular planet gear shafts 64 which surround the sun gear. Each of the tubular planet gear shafts 64 in addition to the central gear 62 has a pair of outer gears 67 and 68 positioned one at either side of the central gear 62 and which mesh with internal ring gears 69 and 70 formed on the fixed housing sections 10 and 12.

A pair of annular support rings 71 and 72 loosely surround a sleeve 73 carrying the sun gear 61 and are positioned within grooves between the center gear 62 and the outer gears 67 and 68.

The support rings 71 and 72 hold the planet gears closely in mesh with the fixed ring gears 69 and 70 and the movable ring gear 56. The planetary structure is a compound differential and the gearing arrangement allows a balancing of the planet gear tooth loads; thereby, need for a planet carrier is eliminated. This allows space for a full complement of planet gear shafts, with there being six of these shafts associated with the sun gear 61 and, therefore, there is greater actuator torque capacity.

The intermediate output stage has a structure the same as that just described for the third stage. There is a sun gear 75 which meshes with the center gears 76 on tubular planet gear shafts 77 and which meshes with the internal ring gear 58 on the movable housing section 32. Each of the planet gear shafts 77 has the outer gears 78 and 79, with the outer gear 78 meshing with the ring gear 70 on the fixed housing section 12 and the outer gear 79 meshing with an internal ring gear 80 on the fixed housing section 14. A pair of support rings 82 and 84 surround a sleeve 85 carrying the sun gear 75 and function to urge the planet gears outwardly against the fixed ring gears 70 and 80 and the movable ring gear 58.

A first stage has a sun gear 88 on a sleeve 89 which meshes with a center gear 90 formed on each of a plurality of tubular planet gear shafts 92 and which meshes with the inwardly-facing ring gear 60 carried on the movable housing section 34. Each of the tubular planet gear shafts 92 has the outer gears 94 and 96 positioned at opposite sides of the center gears 90 and which mesh with the ring gear 80 and an internal ring gear 98 on the fixed housing section 16, respectively. A pair of support rings 100 and 102 surround the sleeve 89 and engage within grooves between the center gear 90 and the end gears 94 and 96 to urge the planet gears against the fixed ring gears 80 and 98 and movable ring gear 60.

The sun gears 61, 75 and 88 are driven from the planet carrier 54 of the simple planetary input stage by a spline connection at 100 to the sleeve 89 for the sun gear 88 and the sleeve 89 is clutched to the sleeve 85 by clutch teeth 101. The sun gear sleeve 85 is clutched to the sun gear sleeve 73 by clutch teeth 102. A tubular member 105 is rotatably associated with the sun gear sleeves and is positioned within the sleeves and in surrounding relation to the drive shaft 46.

The geared rotary actuator has end closures 110 and 112 associated with the fixed housing sections 10 and 16, respectively, and which mount bearing means 114 and 116 for rotatably supporting the drive shaft 46.

The structure of the geared rotary actuator thus far described insofar as compound differentials are used is generally of the type known in the prior art and as generally shown in applicant's copending application Ser. No. 565,675 now U.S. Pat. No. 4,578,993, filed Dec. 30, 1983. the geared rotary actuator utilizes compound differentials wherein the planet gear shafts of the successive stages are in axial alignment and rotate together. When under load, finding forces acting on the outer gears of the planet gear shafts can result in deflection of the planet gear shafts.

Figure 3A:
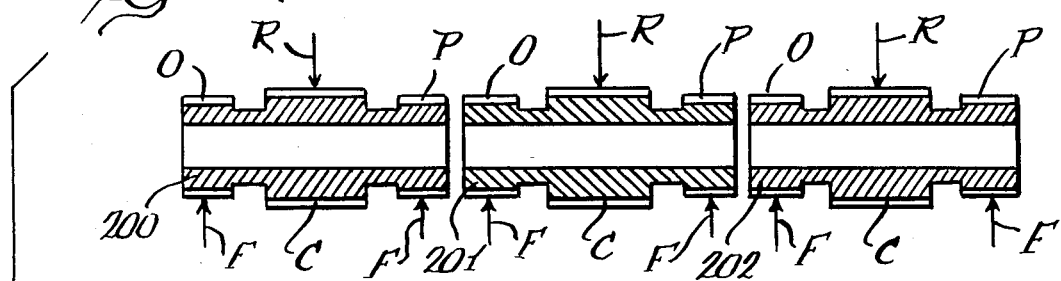
FIG. 3A is a partial schematic of a prior art geared rotary actuator illustrating the forces involved in deflection of the planet gear shafts.
Figure 3B:
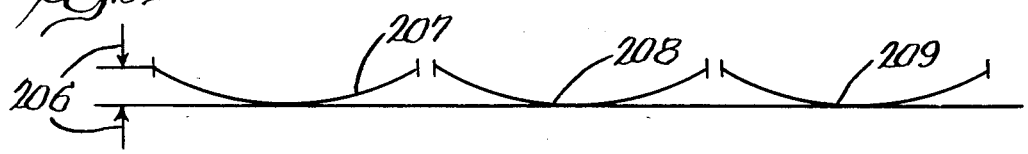
FIG. 3B is a diagrammatic view of the maximum deflections that can result from the bending forces.
Figure 3C:
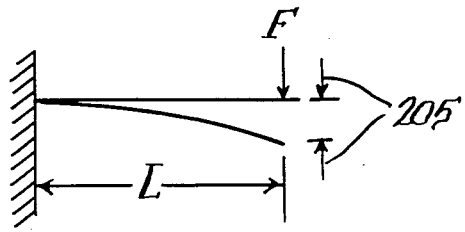
FIG. 3C is an illustration of the cantilever beam principle with one fixed point.

In the prior art devices, this deflection is illustrated in FIG. 3A and 3C wherein a series of axially aligned planet gear shafts 200, 201 and 202 each have a center gear C and outer gears. In operation, the loading for each of the planet gear shafts is a series of cantilever beams with forces F, indicated by the arrows, acting on the outer gears 0 and P and the reactive force, indicated by the arrow R. The possible deflection resulting from the forces F is illustrated in FIGS. 3B and 3C and is subject to the cantilever beam equation for one fixed support point wherein:

$$\text{Max. Def.} = -1/3 \frac{FL^3}{EI} \quad (1)$$

L equals the distance from the support point to the location at which the vector sum of the forces F is applied. From the above equation, it will be noted that the deflection indicated between arrows 205 is proportional to the cube of the length L. The maximum deflection illustrated in FIG. 3C is indicated by the arrows 206 in FIG. 3B and results in a curvature of the planet gear shafts, as illustrated by lines 207, 208 and 209. This maximum deflection can result in the outer gears of the planet gear shafts losing their full mesh with the associated fixed ring gears. This problem has been recognized in the past and either the length of the planet gear shafts has been reduced to reduce the dimension L or suitable gear tooth profile and taper modifications have been made to assure full mesh under maximum load conditions.

Figure 4A:
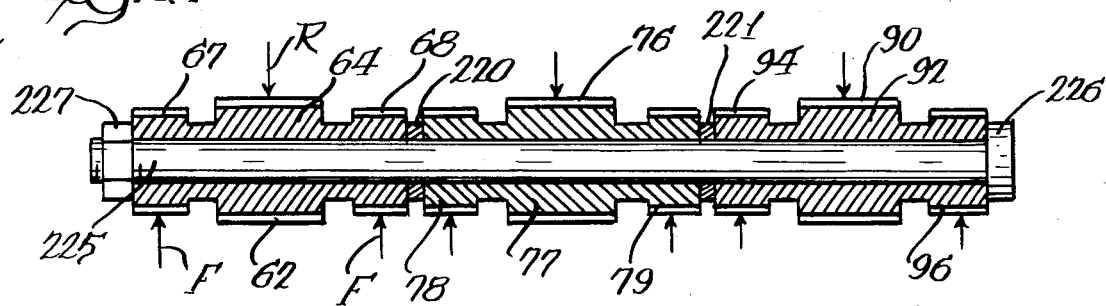
FIG. 4A is a longitudinal sectional view of an axially aligned series of planet gear shafts according to the invention and with the same forces as in FIG. 3A.

The invention embodied in the structure illustrated in FIGS. 1, 2 and 4 resides in the provision of means for reducing the deflection of the planet gear shafts by changing the boundary conditions at the end of each of the planet gear shafts. Due to the construction of the compound differentials, axially aligned planet gear shafts 64, 77, and 92 rotate together and means are extended through the aligned tubular planet gear shafts of the plural differential planetary stages to minimize deflection at the ends of the tubular planet gear shafts. As seen in FIGS. 2 and 4A, spacers 220 and 221 are positioned between the aligned tubular planet gear shafts and a closely-fitting bolt 225 extends through the tubular planet gear shafts, with a head 226 of the bolt abutting an end of the tubular planet gear shaft 92 and a nut 227 threaded on the opposite end thereof and abutting an end of the tubular planet gear shaft 64. Preloading of the tubular gear shafts is not essential, but contributes to the action in minimizing deflection and, in a preferred embodiment, the bolt 225 is torqued to a rated torque value of the bolt. The actual fit of the bolt within the tubular planet gear shafts is with a clearance no more than that required for assembly of the bolt therewith. An example of such clearance can be .002-.005". An alternative to the use of the bolt would be the use of expandable bushings positioned within the interior of the tubular planet gear shafts at the location of the outer gears which would similarly modify the end boundary conditions at the ends of the tubular planet gear shafts.

Figure 4B:
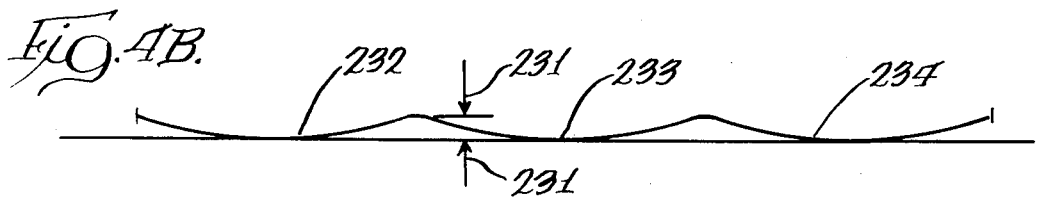
FIG. 4B is a diagrammatic view of the maximum deflections that can result from the binding forces.
Figure 4C:
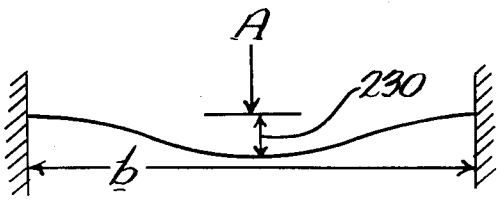
FIG. 4C is an illustration of the cantilever beam principle with two fixed points.

FIGS. 4B and 4C illustrate the reduction in the deflection resulting from the change in the end boundary conditions. The cantilever beam equation for a beam supported at two fixed points is:

$$\text{Max. Def.} = -1/192 \frac{Ab^3}{EI} \quad (2)$$

wherein A equals 2F and b equals 2L. This equation can be reduced to:

$$\text{Max. Def.} = -1/12 \frac{FL^3}{EI} \quad (3)$$

Comparing equation (3) with equation (1) it will be seen that the deflection is reduced by a factor of 4, with the lesser deflection being shown by the arrow 230 in FIG. 4C and by the distance between the arrows 231 in FIG. 4B. This reduced deflection is illustrated by the curved lines 232, 233 and 234 for the tubular planet gear shafts 64, 77 and 92, respectively.

With the invention disclosed herein, a multiple-stage geared rotary actuator having a plurality of compound differential planetary stages can be designed with increased load capability without increase in diameter or addition of stages by use of longer planet gear shafts because of maintaining planet gear shaft deflections within acceptable limits. It is therefore possible to have a geared rotary actuator with higher torque capacity at less cost and at a higher torque capacity per unit weight and volume.

I claim:

1. A geared rotary actuator comprising: a plurality of balanced compound planetary differentials, each differential having a plurality of independent tubular planet gear shafts with a pair of outer gears and a central gear on each tubular planet gear shaft, said central gear being interposed between said outer gears, said central gear meshing with a sun gear and a movable ring gear and said outer gears meshing one with each of a pair of fixed ring gears; the tubular planet gear shafts of adjacent compound differentials being in axially separated end-to-end alignment and rotatable in the same direction; and a tensioned bolt having a lenght greater than the overall length of the aligned tubular planet gear shafts common to said plurality of balanced compound differentials and extending through said aligned tubular planet gear shafts with an assembly clearance for supporting the ends of said tubular planet gear shafts against deflection under a bending load to maintain said outer gears in full mesh with said fixed ring gears.

2. A geared rotary actuator for translating a high-speed low-torque drive into a low-speed high-torque drive output for moving a member comprising, a series of driven sun gears, a plurality of ring gears with one set of ring gears being fixed and in spaced relation and a second set of ring gears being movable and one in each space between fixedx ring gears and with the movable ring gears surrounding the sun gears, a plurality of tubular planet gear shafts associated with each sun gear and each having a central gear in mesh with the sun gear and said surrounding movable ring gear and a pair of outer gears at opposite sides of the central gear in mesh with the fixed ring gears, said tubular planet gear shafts associated with a sun gear being in alignment with and rotating about the sun gear in the same direction as the tubular planet gear shafts associated with an adjacent sun gear, the tubular planet gear shafts of adjacent sun gears being in spaced-apart end-to-end relation, and a tensioned bolt fitted within the tubular planet gear shafts with an assembly clearance and common to and having a length greater than the overall length of a group of axially aligned tubular plant gear shafts to preload said adjacent tubular planet gear shafts and support the ends thereof against deflection under load to maintain said outer gears in full mesh with said fixed ring gears.

* * * * *